Patented Feb. 2, 1932

1,843,220

UNITED STATES PATENT OFFICE

CHRISTIAN JOHANNES HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

METHOD OF DECOMPOSING SULPHUR-OXYGEN COMPOUNDS

No Drawing. Application filed August 2, 1929, Serial No. 383,177, and in Germany May 29, 1929.

My invention refers to the decomposition of sulphur-oxygen compounds and one of its objects is to provide means whereby such decomposition can be effected in a more efficient manner than was hitherto possible.

As is well known to those skilled in the art, ammonium sulphate and sulphur are obtained by the decomposition of salts of sulphur-oxygen compounds, more especially acids, at elevated temperature. Quite a number of methods have been devised for effecting this decomposition, which is particularly important in those cases, where mixtures are being treated which are obtained by the removal of ammonia and hydrogen sulphide from coke oven gases, but also in the case where ammonia obtained by synthetical methods is converted into ammonium sulphate by means of sulphur dioxide. The methods mentioned above also allow producing ammonium sulphate from ammonium thiocyanate recovered in the purification of gases.

There is a number of mixtures which are adapted to be completely converted into ammonium sulphate and sulphur by mere heating, no other products of decomposition being formed excepting carbon dioxide if ammonium thiocyanate is present. As no corrosive acids, such as sulphuric acid or polythionic acids are formed in the course of the decomposition and the reaction mass will ultimately become neutral, such mixtures could be termed "neutrality mixtures." Mixtures of this type are the following:—

1. 2 mols. bisulphite + 1 mol. sulphite
2. 2 mols. bisulphite + 1 mol. thiosulphate
3. 1 mol. polythionate + 2 mols. sulphite
4. 1 mol. polythionate + 2 mols. thiosulphate
5. 2 mols. thiosulphate + 1 mol. sulphur dioxide
6. 3 mols. thiosulphate + 1 mol. sulphuric acid
7. 1 mol. ammonium thiocyanate + 2 mols. sulphuric acid
8. 1 mol. ammonium thiocyanate + 2 mols. polythionate
9. 1 mol. ammonium thiocyanate + 8 mols. bisulphite As a matter of course these mixtures may be combined with each other in any desired proportion without losing their neutrality properties.

The mixtures enumerated under 1 to 6, which do not contain any thiocyanate, will be gradually converted into sulphate and sulphur already at ordinary or moderately raised temperature. In contradistinction thereto the mixtures mentioned under 7 to 9, which contain ammonium thiocyanate, must be heated under pressure to temperatures above 140° C.

The great difficulties encountered in effecting such decompositions on a commercial scale result from the fact that starting mixtures containing the various components in substantially theoretical proportions can hardly be obtained without the expenditure and loss of time involved in current analytical work. Ammonia being the most valuable of the reaction components, an excess of sulphur compounds in the starting mixture is practically indispensable, but leads to a more or less considerable contents of free sulphuric acid in the reaction mass ultimately obtained. This free sulphuric acid exerts, particularly at elevated temperatures and under increased pressure, a vigorous corrosive action on the reaction vessels, particularly if these consist of metals, as is highly desirable in view of their mechanical and heat-transmission properties.

These difficulties cannot be overcome by using vessels consisting of or lined with lead. It is true that lead and certain lead alloys containing either copper or antimony are to a certain extent resistive against dilute sulphuric acid at temperatures up to about 100° C. However even these alloys are vehemently attacked already at room temperature by dilute sulphuric acid in the presence of thiosulphate or thiosulphate and sulphur dioxide.

I have now ascertained that all these conversions can be carried through easily in apparatus, the inner walls of which consist of chromium-nickel or chromium-nickel-iron alloys, which may also contain additions of other metals, such as copper or molybdenum. The alloys here in question are described for instance in U. S. patent specifications 1,404,907, 1,316,817, 1,404,908, 1,339,378, 1,587,614, and 1,533,712.

Obviously the reaction vessels may consist altogether of one of these alloys or they may be lined with one of these alloys and the connecting tubes, valves and the like may also consist of or be lined with one of the alloys mentioned above.

It is true that at temperatures approaching 100° C. these alloys are attacked by dilute sulphuric acid. I have found, however, that they will resist the action of ammonium sulphate solutions containing sulphuric acid, if care is taken that the conversion is not carried entirely to the end, so that small quantities of non-decomposed substances remain over in the reaction solution. I have ascertained that such small quantities of undecomposed substances such as thiosulphuric and polythionic acid compounds and the like exert an extraordinarily powerful protective effect on the said metal alloys, a fact, which is the more astonishing since the presence of these very substances highly increases the corrosive action of sulphuric acid on lead and lead alloys, as stated above.

For instance if salt solutions containing 50% salts are heated in a vessel consisting of or lined with chromium-nickel-steel, which may or may not contain copper and/or molybdenum, as defined in one of the patent specifications mentioned above, temperatures of 200° C. and above may be used for effecting decomposition without the metal being substantially attacked thereby, provided that the conversion is conducted only so far that 0,1 to 1% of undecomposed compounds remain over in the solution. In such a case 50 grams or more free sulphuric acid per litre may be present in the final solution and still no corrosion of the metal walls of the reaction vessel will occur.

I have further found that the mode of proceeding above described involves further advantages. Firstly, conversion will proceed much quicker in the presence of free acid than if the neutrality mixtures enumerated above are treated, more particularly in the case where ammonium thiocyanate is present. Further on, systematically operating in acid solution involves a great simplification inasmuch as the necessity of carefully controlling the composition of the starting mixtures is thus done away with.

I, therefore, take care that there is always some sulphur dioxide, sulphuric acid, bisulphite or polythionate in excess present in the mixture beyond the quantity required for producing a neutral sulphate solution, and I further provide that the conversion is not carried altogether to the end, so that some undecomposed salt remains over in the final product. By thus proceeding I can operate at high temperatures without any danger of the walls of the reaction vessel being attacked.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of decomposing mixtures of sulphur-oxygen compounds and ammonium compounds to produce ammonium sulphate and free sulphur, comprising heating such mixture in a vessel, the inner walls of which consist of a chromium nickel alloy.

2. The method of decomposing mixtures of sulphur-oxygen compounds and ammonium compounds to produce ammonium sulphate and free sulphur, comprising heating such mixture in a vessel, the inner walls of which consist of a chromium nickel iron alloy.

3. The method of decomposing mixtures of sulphur-oxygen compounds and ammonium compounds to produce ammonium sulphate and free sulphur, comprising heating such mixture in a vessel, the inner walls of which consist of a chromium nickel iron alloy containing a fourth metal.

4. The method of decomposing mixtures of sulphur-oxygen compounds and ammonium compounds to produce ammonium sulphate and free sulphur, comprising heating such mixture in a vessel, the inner walls of which consist of a chromium nickel alloy, care being taken to retain undecomposed in the vessel throughout the operation some excess of the starting compounds.

5. The method of decomposing mixtures of sulphur-oxygen compounds and ammonium compounds to produce ammonium sulphate and free sulphur, comprising operating with a starting mixture having a content of sulphur-oxygen compounds higher than necessary to ultimately convert all the ammonia compounds into ammonium sulphate and free sulphur, heating such mixture in a vessel, the inner walls of which consist of a chromium nickel alloy.

In testimony whereof I affix my signature.

CHRISTIAN JOHANNES HANSEN.